I. B. BUCKLIN.

Cook Stove.

No. 22. Reissued Aug. 27, 1840.

N. PETERS. Photo-Lithographer, Washington, D. C.

UNITED STATES PATENT OFFICE.

ISAAC B. BUCKLIN, OF WEST TROY, NEW YORK.

IMPROVED RAILWAY COOKING-STOVE.

Specification forming part of Letters Patent No. 825, dated July 9, 1838; Reissue No. 22, dated August 27, 1840.

*To all whom it may concern:*

Be it known that I, ISAAC B. BUCKLIN, of the village of West Troy, in the county of Albany, State of New York, have invented a new and Improved Railway Cooking-Stove; and I do hereby declare that the following is a full and exact description thereof.

This stove is so constructed that the part which contains the hearth, the fire-apartment, the hot-air apartment, the boiler-holes, and the alternating opening to let off heated air and smoke is movable upon rollers and may be slid backward and forward under the part containing the oven. By the backward movement of this part the hot-air apartment passes under the part containing the oven, and the hearth and fire-apartment only remain in front of the oven, and thus the space occupied in front of the oven is decreased or diminished. By the forward movement of this part the hot-air apartment is drawn from under the part containing the oven, except the space occupied by the rear opening, and the hearth, the fire-apartment, and hot-air apartment are all placed in front of the oven, and thus the space occupied in front of the oven is increased or enlarged.

In the accompanying drawings, Figure 1 is a perspective view of the stove or movable part and the stationary part containing the oven combined or associated together. A A is the stove or movable part, consisting of a hearth in front, a fire-apartment firmly fixed to the hearth and closed with doors, a hot-air apartment in rear of the fire-apartment, having a top-plate with boiler-holes over the fire-apartment, with boiler-holes and an opening alternating from front to rear over the hot-air apartment. The opening alternating from front to rear over the hot-air apartment is made to let off heat and smoke into the flue around the part containing the oven. In other respects this part is constructed in the usual manner. This part has usually four boiler-holes, as seen in the drawings, and the hot-air apartment is extended back, as shown at B. This part is supported by legs C C, fixed to the bottom or hearth plate. These legs are furnished with rollers, which run upon ways D D, below the stove, that it may be easily moved backward or forward under the part containing the oven. The back or upper part, E, which contains the oven, stands steadily upon legs or supports F F. This part is surrounded by a flue for the passage of heated air and smoke as received from the stove or movable part. This part has an opening across the front of the bottom plate communicating with the surrounding flue and corresponding with the opening produced in the stove or movable part by the backward and forward movement of the sliding plate over the hot-air apartment. The top plate of the stove or movable part A A, in which are the front boiler-holes, does not cover the hot-air apartment, but is so constructed as to extend back a narrow slip in form of a ledge entirely around the hot-air apartment, on which that part of it containing the two holes in the rear, and consisting of a sliding plate having a rod attached to it, is moved backward and forward. The rod attached to the sliding plate extends forward between the front boiler-holes through a hole in the front plate of the fire-apartment and there forms a ring or loop by which the plate and stove are moved backward and forward. By the backward movement of the sliding plate a division or opening is made between it and the front part of the top plate, directly in rear of the front boiler-holes. By the forward movement of the sliding plate the division or opening made by the backward movement of said plate is closed, and a like division or opening is made between said sliding plate and the ledge running across and parallel with the back plate of the hot-air apartment in rear of the back boiler-holes. The backward and forward movement of the sliding plate and the backward and forward movement of the stove or movable part A A, under the back or upper part, E, containing the oven, are simultaneous with each other, being effected at the same time by the same power and motion.

Fig. 2 is a top view of the stove or movable part A A, G G being the boiler-holes in the permanent plate over the fire-apartment, and H H the boiler-holes in the sliding plate over the hot-air apartment. The dotted line shows the rod by which this plate is to be moved, as represented in this figure. The position of the sliding plate in this figure is that which is given to it when the stove or movable part A A has been slid back upon its ways and the hot-air apartment with the boiler-holes H H in the sliding plate are removed under the back or upper part, E, which contains the oven. In this position of the sliding plate the division or opening I I in front of the sliding plate, and directly in rear of the front boiler-holes made by the backward movement of the sliding plate, is brought directly under the opening or throat of the flue which surrounds the oven, this opening or throat being on the front side of the part containing the oven, as described in Fig. 1. When the stove or movable part has been slid forward on its ways, and the hot-air apartment, with the boiler-holes H H in the sliding plate, are removed from under the back or upper part, E, which contains the oven, then the sliding plate is drawn forward in contact with the permanent plate, and the division I I in front of the sliding plate is closed and immediately transferred to the rear of said plate, and then brought directly under the opening or throat of the flue which surrounds the oven.

Figure 1:
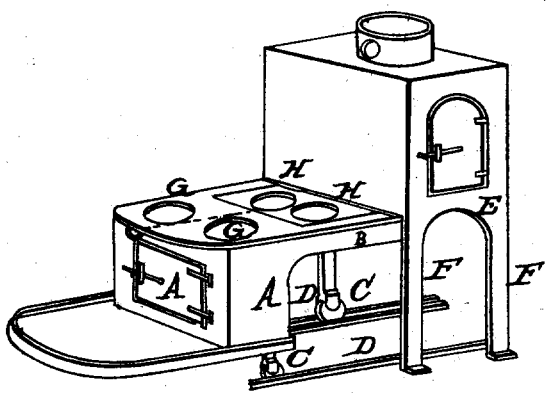
Figure 2:
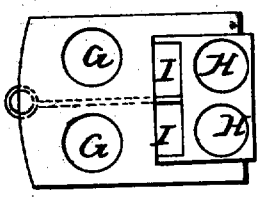
Figure 3:
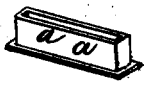
Fig. 3 is a movable flue, which is made to fit into the opening or throat of the oven-flue, in which it moves freely. Its lower edge rests upon the top plate of the stove or movable part A A, thus forming a close connection between this part and the back or upper part, E, which contains the oven, while one of them may still slide freely under the other.
Figure 4:
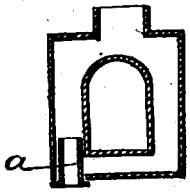
Fig. 4 is a section of the oven and its flues, exhibiting the connection between this part and the stove or movable part and the position of the movable flue *a a*.

I do not claim any of the above-described different parts of the stove or oven or cooking apparatus separately and independently of the combinations herein set forth and claimed; nor do I claim any combination or combinations not herein specially set forth and claimed as my invention and improvement; nor do I intend to claim any movable grate, fire-chamber, or fire-box made to move within a stationary stove and without moving the stove in which they are placed; but

I claim as my invention and improvement—

A stove so made as to separate from and move out under the flue and oven and other cooking apparatus of the above-described cooking-stove, in combination with the above-described movable flue and sliding or alternating plate and oven or baking part of said cooking-stove. And, to prevent mistake as to the nature and extent of my claim, I repeat that my claim does not extend to a movable fire-grate, fire-box, or fire-chamber made to slide in a fixed and stationary stove, but extends simply to the combination of the movable stove with the movable flue and alternating or sliding plate and the oven or baking part of said cooking apparatus, and to the combination of each of said parts with the other.

New York, July 28, 1840.

ISAAC B. BUCKLIN.

Witnesses:
FREDERICK R. SHERMAN,
SETH P. STAPLES.